United States Patent Office 3,507,955
Patented Apr. 21, 1970

3,507,955
SILICONE CONTAINING DENTIFRICES
Lloyd I. Osipow, New York, N.Y., assignor to Prev-Coat Corporation, Bridgeport, Conn., a corporation of Connecticut
No Drawing. Continuation-in-part of application Ser. No. 504,163, Oct. 23, 1965. This application Nov. 25, 1968, Ser. No. 778,815
Int. Cl. A61k 7/16
U.S. Cl. 424—54                                                7 Claims

ABSTRACT OF THE DISCLOSURE

Anti-caries dentifrice compositions containing a di-methylpolysiloxane having a viscosity of 50 to 5000 centistokes and a small amount of an additive, such as a quaternized tertiary cyclic amine substituted on the nitrogen with an aliphatic radical of 8 to 22 carbon atoms.

Prior application

The present application is a continuation-in-part application of my copending, commonly assigned U.S. patent application Ser. No. 504,163, filed Oct. 23, 1965 now abandoned.

Prior art

Various attempts have been made to solve the problem of dental decay but the problem still exists. Fluoridization of drinking water and regular and frequent use of certain prophylactic dentifrices containing active fluorides have been shown to reduce somewhat dental decay incidence in children, but such measures are not effective for older persons whose teeth have already formed.

The addition of silicone oils with and without an organic titanate to dentifrice compositions have been proposed but experience has shown that these inert silicone oils do not form durable or continuous coatings on teeth because the moisture on the teeth and in the dentifrice interferes with the deposit of the silicone film on the teeth. This is believed to be due to the fact that there is a stronger attraction between the polar surface of teeth and water, which is polar, than between the teeth and less polar silicone oils which causes at least partial displacement of the silicone film by water.

Much work has been published on silicone compositions that will deposit durable silicone films on polar substances such as glass. These compositions generally employ reactive silicones such as alkyl alkoxy silanes and particularly effective are reactive silicones with an organic ester of titanium. However, these compositions must be stored under anhydrous conditions or they polymerize and become useless. Since most dentifrices contain water, these reactive silicones cannot be used in dentifrices.

Objects of the invention

It is an object of the invention to provide novel dentifrices containing silicone oils which will preferentially coat teeth with a silicone film.

It is another object of the invention to provide a novel method of eliminating or drastically reducing the incidence of dental decay.

These and other objects and advantages of the invention will become obvious from the following detailed description.

The invention

The novel dentifrice compositions of the invention contain as the anti-caries agent 3 to 7% by weight of a di-methylpolysiloxane having a viscosity of 50 to 5000, preferably 200 to 1000 centistokes, and 0.05 to 2% by weight of quaternized tertiary cyclic amine substituted on the nitrogen atom with an aliphatic radical of 8 to 22 carbon atoms.

The compositions of the invention preferentially coat the teeth with a silicone film which adheres tenaciously to teeth even in the presence of water and saliva and have the advantage that it is not necessary to isolate and dry the teeth to be treated. Another advantage of the compositions is that the silicone film builds up with each subsequent treatment, i.e., brushing of the teeth. In this way, regular brushing of the teeth provides a more continuous and possible thicker film which provides added protection against cavities and tartar formation. An important cosmetic advantage is that teeth treated with he compositions of the invention have à more pronounced shine or sheen.

The di-methylpolysiloxane which may be used in the compositions of the invention are those having a viscosity of 50 to 5000 centistokes and are made by the Dow Corning Company under trade names such as Silicone DC 200, and by General Electric under tradenames such as SF–96 silicone fluid. They may be dimethylpolysiloxane. An example of a suitable quaternized tertiary cyclic amine useful for the purposes of the invention is cetyl pyridinium chloride or other halides thereof.

Examples of suitable inert, physiologically acceptable organic solvents are lower alkyl esters of higher fatty acids of 10 to 22 carbon atoms such as isopropyl myristate, butyl stearate, ethyl palmitate, etc.

The compositions of the invention may be used for topical application by dentists in orthodontic treatment or may be in the form of mouth washes, tooth pastes, tooth powders, dental creams, chewing gums, denture cleaners, etc.

A preferred form of the compositions of the invention is a toothpaste comprised of an abrasive, about 3 to 7% of a dimethylpolysiloxane, 0.05 to 2% of an additive selected from the group consisting of amines and quaternary ammonium salts containing a high molecular weight, long chain of 8 to 22 carbon atoms and 0 to 50% of an organic solvent.

In the following examples there are described several preferred embodiments to illustrate the invention. However, it should be understood that the invention is not intended to be limited to the specific embodiments.

EXAMPLE I

|  | Parts by weight | |
|---|---|---|
|  | A | B |
| Methocel 90 HG (viscosity, 400 cp.) | 0.5 | 0.5 |
| Water | 19.2 | 19.5 |
| Cetyl pyridinium chloride | 0.3 | |
| Silicone SF 96 (viscosity, 1,000 cs.) | 20.0 | 20.0 |
| Glycerine | 25.0 | 25.0 |
| Dicalcium phosphate, dihydrate | 35.0 | 35.0 |

Toothpastes having the above compositions were prepared by dispersing cetyl pyridinium chloride in the silicone and emulsifying the mixture in water and thickened with Methocel. The gylcerine and dicalcium phosphate dihydrate were thoroughly admixed together and the silicone-water emulsion was added thereto and the mixture was homogenized to form the final toothpaste.

Extracted teeth which had been cleaned by vapor degreasing with perchloroethylene were brushed with the toothpastes, rinsed under running tap water for 2 minutes and then blotted dry with tissue. The continuity of the silicone film was determined by placing drops of water on the teeth and measuring the contact angle under a microscope using a goniometer (protractor) eye-piece. Five different drops were measured to obtain an average value. The higher the contact angle, the more continuous the silicone film on the teeth. The contact angle before brushing was 40° and after brushing the contact angle was 57° for toothpaste A and only 53° for toothpaste B. This shows that the silicone film was more continuous when the additive was used and that the silicone with the additive had a greater affinity for the teeth than the silicone without the additive.

EXAMPLE II

To demonstrate that the compositions of the invention have a greater affinity for polar surfaces than water, the following test was performed using clean glass microscopic slides instead of teeth. Both glass and teeth have polar surfaces and the glass slides were used for this extensive test because of their ready availability and reproducible surfaces. The glass slides were suspended in water and a drop of the test silicone oil was deposited on the under portion of the slide and the contact angle within the drop was measured. A contact angle of 90° indicates that the silicone and water have equal affinity for the polar glass surface. A contact angle greater than 90° indicates that water preferentially wets the polar glass surface while a contact angle less than 90° indicates that the silicone composition preferentially wets or has a greater affinity for the polar glass surface. The results are summarized in Table I.

99° and lauroyl sarcosinate acid had a contact angle of 92°. A 2% solution of triethanolamine titanate-N-stearate in silicone oil SF 96 having a viscosity of 500 centistokes had no effect on the contact angle.

In contrast thereto, a 1% dispersion of cetyl pyridinum chloride in silicone oil SF 96 having a viscosity of 500 centistokes had a contact angle of only 52°. The latter composition had a greater affinity for polar surfaces and will preferentially wet teeth in the presence of water while the other compositions will not.

EXAMPLE IV

A series of toothpastes was prepared without silicone, with silicone, and with silicone plus various additives. These toothpastes were brushed on clean glass slides. After brushing, the slides were rinsed under running tap water for 2 minutes and then blotted dry with tissue. The continuity of the hydrophobic silicone films which formed on the slides was determined by placing drops of water on the slides and measuring the contact angles of these water drops under a microscope using a goniometer eye-piece. The glass slides were again brushed with the same toothpaste used for the previous brushing, rinsed, dried, and measurements were again made of the contact angles of water droplets on the slides, as in the previous sequence. An increase in contact angle in the second sequence would show that there is a tendency for the hydrophobic film to build-up on repeated brushing.

The formulations used for this comparison are as follows:

| | Parts by Weight | | | | | | | | | | | |
|---|---|---|---|---|---|---|---|---|---|---|---|---|
| | A | B | C | D | E | F | G | H | I | J | K | L |
| Methocel 90 HG, 400 cp | 0.5 | 0.5 | 0.5 | 0.5 | 0.5 | 0.5 | 0.5 | 0.6 | 0.6 | 0.6 | 0.5 | 0.5 |
| Water | 19.2 | 19.5 | 39.5 | 19.5 | 19.4 | 19.5 | 21.3 | 23.4 | 24.2 | 23.8 | 19.4 | 19.4 |
| Silicone SF 96/1,000 cs | 20.0 | 20.0 | | 20.0 | 20.0 | 20.0 | 11.0 | 5.9 | 1.2 | 1.2 | 20.0 | 20.0 |
| Glycerine | 25.0 | 25.0 | 25.0 | 25.0 | 25.0 | 25.0 | 28.0 | 29.0 | 31.0 | 31.0 | 25.0 | 25.0 |
| Dicalcium phosphate, anhydrous | | | 35.0 | 35.0 | 35.0 | 35.0 | 39.0 | 41.0 | 43.0 | 43.0 | 35.0 | 35.0 |
| Armeen 2S | | | | 0.3 | | | | | | | | |
| Cetyl pyridinium chloride | 0.3 | | | | 0.1 | 0.03 | 0.15 | 0.1 | 0.02 | 0.37 | | |
| Dicalcium phosphate, dihydrate | 35.0 | 35.0 | | | | | | | | | | |

| Additive | Amount of additive in gm. | Contact angle in degrees |
|---|---|---|
| Series I: | | |
| Triethanolamine titanate N-oleate | 0.6 | 134 |
| Cetyl Pyridinium Chloride | 0.3 | 57 |
| Series II: | | |
| Silicone (without additive) | 0 | 135 |
| Equal parts of silicone+isopropyl myristate | 0 | 135 |

In series I, the additive in 30 gm. of SF 96 having a viscosity of 500 centistokes and 70 gm. of isopropyl myristate was emulsified in 70 gm. of water. The said emulsions were broken and the separated silicone phases were used to form the silicone drops on glass slides that were immersed in the water phases recovered from the broken emulsions. In series II, a drop of silicone or silicone plus isopropyl myristate was placed on a glass slide immersed in distilled water. As can be seen from Table I, the compositions of the invention result in wetting of the polar glass substrate by silicone in preference to the wetting of the substrate by water.

EXAMPLE III

A number of additional silicone compositions were tested using the procedure of Example II, Series III. The silicone composition consisted of a 1:2 mixture of silicone oil SF 96 having a viscosity of 500 centistokes and isopropyl myristate containing 0.3% of the additive. The additives, sodium coconut soap, Petronate L (mahogany soap) and Igepal CO430 (a nonionic surfactant) had no effect on the contact angle which remained at 135°. Emcol 61 (oleyl isopropanolamide) had a contact angle of 109°, Alcolec DS (lecithin) had a contact angle of The following results were obtained with these formulations:

| | | | | Contact angle measured in water drop (deg.) | |
|---|---|---|---|---|---|
| Ex. | Silicone, percent | Additive | Additive, percent | After first brushing | After second brushing |
| A | 20 | CPC | 0.3 | 68 | 82 |
| B | 20 | | | 24 | 42 |
| C | | | | 14 | |
| D | 20 | Armeen 2S | 0.3 | 41 | 52 |
| E | 20 | CPC | 0.1 | 80 | 84 |
| F | 20 | CPC | 0.03 | 63 | 67 |
| G | 11 | CPC | 0.15 | 71 | 71 |
| H | 5.9 | CPC | 0.1 | 63 | 64 |
| I | 1.2 | CPC | 0.02 | 37 | 49 |
| J | 1.2 | CPC | 0.37 | 51 | 61 |

CPC=cetyl pyridinium chloride.

In the absence of silicone (C), the glass slide remains hydrophilic, as shown by the low contact angle of water. The presence of 20% silicone in the toothpaste without additive (B) results in some deposit of silicone as evidenced by the somewhat higher contact angle obtained with this composition as compared with the result obtained with the toothpaste without silicone. The highest contact angles, and consequently the most hydrophobic surfaces, were obtained using 20% silicone with 0.1% cetyl pyridinium chloride. With as little as 1.2% silicone and 0.02% cetyl pyridinium chloride, higher contact angles were obtained than with 20% silicone without additive.

EXAMPLE V

Ivory panels, which are similar to teeth in composition, were polished by buffing with a series of abrasives and thoroughly cleaned. The panels were then brushed with the following toothpaste compositions, rinsed for 2 minutes under tap water, and the contact angles of water droplets on the ivory were measured. The toothpaste compositions used, and the contact angle results follow:

|  | Parts by weight | | | |
| --- | --- | --- | --- | --- |
|  | A | B | C | D |
| Methocel 90 HG, 4,000 cp | 0.6 | 0.6 | 0.6 | 0.6 |
| Water | 22.3 | 21.4 | 22.3 | 22.3 |
| Silicone SF, 96/1,000 cs | 5.0 | 5.0 | 5.0 | 5.0 |
| Propylene glycol | 24.0 | 24.0 | 24.0 | 24.0 |
| Glycerine | 5.0 | 5.0 | 5.0 | 5.0 |
| Dicalcium phosphate, dihydrate | 43.0 | 43.0 | 43.0 | 43.0 |
| Sodium stearate | 0.1 | 1.0 |  |  |
| Arquad 2C-75 |  |  | 0.1 |  |

| Example | Contact Angle Measured in Water Drop on Ivory (deg.) | |
| --- | --- | --- |
|  | Before brushing | After brushing |
| A | 27 | 29 |
| B | 38 | 40 |
| C | 32 | 50 |
| D | 40 | 45 |

The variation in the contact angles obtained on cleaned ivory panels before brushing shows the difficulty in obtaining reproducible angles on these surfaces. Only with the quaternary ammonium compound present in the toothpaste was there a substantial and significant increase in the contact angle after brushing, as compared with the value obtained before brushing with the toothpastes.

EXAMPLE VI

Mouth wash composition

Sodium chloride—2 gm.
Sodium bicarbonate—1 gm.
Amaranth solution—0.1 gm.
Silicone SF 96 (viscosity 600 cs.)—40 gm.
Cetyl pyridinium chloride—1 gm.
Distilled water—Sufficient to make 240 ml. of solution.

EXAMPLE VII

Denture cleaner composition

Trisodium phosphate—120 gm.
Oil of cinnamon—0.3 ml.
Silicone SF 96 (viscosity 600 cs.)—20 gm.
Cetyl pyridinium chloride—0.5 gm.

EXAMPLE VIII

Toothpaste composition

| | Parts by weight |
| --- | --- |
| Methocel N. F. 90 HG, 4000 cps. | 0.54 |
| Cetyl pyridinium chloride | 0.10 |
| Calcium cyclamate | 1.00 |
| Sodium saccharin | 0.10 |
| Flavor | 1.00 |
| Silicone SF/96, 1000 cps. (dimethylpolysiloxane) | 5.00 |
| Water | 20.46 |
| Glycerine | 4.30 |
| Propylene glycol | 21.00 |
| Dicalcium phosphate, dihydrate | 46.50 |

The toothpaste was prepared by making a slurry of Methocel in the propylene glycol to which cold water was added and the mixture was stirred until homogenous after which the glycerine followed by all the other ingredients except the dicalcium phosphate was blended into the said mixture. The dicalcium phosphate was slowly sifted into the homogenous mass in a ribbon blender.

In one clinical study using the above toothpaste, 62 patients used the toothpaste above, 31 patients used an identical toothpaste without the dimethylpolysiloxane and 34 patients used an identical toothpaste without the cetyl pyridinium chloride. The caries incidence (all unfilled cavities, discovered) was determined for each group in the year preceding the test and after 10 months of the test. The toothpaste without the dimethylpolysiloxane showed no substantial effect on caries incidence and the toothpaste without the cetyl pyridinium chloride reduced caries incidence by about 61% while the toothpaste of Example VIII reduced caries incidence by 90%. Most of the patients in the study were children wearing orthodontic appliances which made brushing difficult. No detrimental effects were observed during the entire test.

Various modifications of the compositions and method of the invention may be made without departing from the scope or spirit thereof.

I claim:

1. A dentifrice composition containing as the anti-carie agent 3 to 7% by weight of a dimethylpolysiloxane having a viscosity of 50 to 5000 centistokes and 0.5 to 2% by weight of quaternized tertiary cyclic amines substituted on the nitrogen with an aliphatic radical of 8 to 22 carbon atoms.

2. The composition of claim 1 wherein the polysiloxane has a viscosity of 200 to 1000 centistokes.

3. The composition of claim 1 containing up to 50% of a lower alkyl ester of a higher fatty acid.

4. A method of forming a silicone film on teeth which comprises contacting the teeth with a composition of claim 1.

5. The method of claim 4 wherein the dimethylpolysiloxane has a viscosity of 200 to 1000 centistokes.

6. A dentifrice composition of claim 1 containing 3 to 7% by weight of a dimethylpolysiloxane having a viscosity of 200 to 1000 centistokes and 0.05 to 2.0% by weight of cetyl pyridinium chloride.

7. The dentifrice composition of claim 6 in the form of a toothpaste and wherein the amount of dimethylpolysiloxane is about 5% by weight and the amount of cetyl pyridinium chloride is about 0.1% by weight.

References Cited

UNITED STATES PATENTS

| 3,120,469 | 2/1964 | Tamas | 424—54 |
| 3,161,614 | 12/1964 | Brown et al. | |
| 3,223,588 | 12/1965 | Pickel | 424—54 |
| 3,277,118 | 10/1966 | Schmid et al. | 424—52 |
| 3,428,580 | 2/1969 | Nitzsche et al. | |

OTHER REFERENCES

Boyers et al.: Journal of Dental Research, vol. 42, pp. 1517–1519, November–December 1956.

Green et al.: Journal of Dental Research, vol. 30, pp. 218–224, April 1951.

Lesser: Soap and Sanitary Chemicals, vol. 28, pp. 51–53, February 1952.

RICHARD L. HUFF, Primary Examiner

U.S. Cl. X.R.

424—184